United States Patent
Wager et al.

(10) Patent No.: US 11,388,766 B2
(45) Date of Patent: Jul. 12, 2022

(54) METHOD AND ARRANGEMENT FOR CONNECTION RE-ESTABLISHMENT IN A TELECOMMUNICATION SYSTEM

(71) Applicant: Telefonaktiebolaget LM Ericsson (publ), Stockholm (SE)

(72) Inventors: Stefan Wager, Espoo (FI); Mats Sågfors, Kyrkslätt (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 13 days.

(21) Appl. No.: 16/860,186

(22) Filed: Apr. 28, 2020

(65) Prior Publication Data
US 2020/0275507 A1   Aug. 27, 2020

Related U.S. Application Data

(60) Division of application No. 16/414,318, filed on May 16, 2019, now Pat. No. 10,674,559, which is a
(Continued)

(51) Int. Cl.
*H04W 4/00* (2018.01)
*H04W 76/18* (2018.01)
(Continued)

(52) U.S. Cl.
CPC ........... *H04W 76/18* (2018.02); *H04W 76/19* (2018.02); *H04W 36/0033* (2013.01); *H04W 36/30* (2013.01)

(58) Field of Classification Search
CPC . H04W 76/18; H04W 76/19; H04W 36/0033; H04W 36/30; H04W 28/04; H04W 48/02; H04L 47/74
See application file for complete search history.

(56) References Cited

U.S. PATENT DOCUMENTS

2001/0031638 A1* 10/2001 Korpela ............... H04W 36/04
455/434
2006/0234676 A1   10/2006 Harris
(Continued)

FOREIGN PATENT DOCUMENTS

CN    101505508    8/2009
CN    101919284    12/2010
(Continued)

OTHER PUBLICATIONS

"Early Termination of T310," 3GPP TSG-RAN WG2 meeting #78; Prague, Czech Republic; R2-122185, May 21-25, 2012.
(Continued)

*Primary Examiner* — Siren Wei
(74) *Attorney, Agent, or Firm* — Baker Botts, LLP

(57) ABSTRACT

The invention relates to a method in a user equipment and a user equipment (700) for controlling connection re-establishment between said user equipment and a network. The method comprises the steps of —receiving (501) a configuration message from the network defining at least one condition; —upon detection of connectivity problems (503) towards the first cell, evaluating said at least one condition (504); —if said at least one condition is fulfilled for a neighboring cell (B), applying at least one special criterion for initiating connection re-establishment to said neighboring cell (505), said at least one special criterion being different from at least one criterion that is applied if said at least one condition is not fulfilled. The invention furthermore relates to a method and an arrangement in a network node (800) for controlling connection re-establishment between the network and a user equipment (700).

16 Claims, 7 Drawing Sheets

Related U.S. Application Data continuation of application No. 14/381,492, filed as application No. PCT/SE2012/050288 on Mar. 15, 2012, now Pat. No. 10,306,694.

(51) Int. Cl.
*H04W 76/19* (2018.01)
*H04W 36/00* (2009.01)
*H04W 36/30* (2009.01)

(56) References Cited

U.S. PATENT DOCUMENTS

| | | | |
|---|---|---|---|
| 2008/0076434 A1 | 3/2008 | Shigaki et al. | |
| 2009/0005029 A1* | 1/2009 | Wang | H04W 72/1226 455/423 |
| 2009/0181676 A1* | 7/2009 | Lee | H04J 11/0093 455/436 |
| 2009/0318155 A1* | 12/2009 | Fukuzawa | H04W 36/0061 455/438 |
| 2010/0093356 A1 | 4/2010 | Lee | |
| 2010/0222055 A1* | 9/2010 | Cho | H04W 16/24 455/434 |
| 2011/0019532 A1 | 1/2011 | Jung et al. | |
| 2011/0080825 A1 | 4/2011 | Dimou et al. | |
| 2011/0124340 A1* | 5/2011 | Puttonen | H04W 36/0058 455/437 |
| 2012/0039226 A1* | 2/2012 | Yang | H04W 52/0277 370/331 |
| 2013/0182563 A1 | 7/2013 | Johansson | |
| 2014/0023032 A1 | 1/2014 | Kim | |

FOREIGN PATENT DOCUMENTS

| | | |
|---|---|---|
| CN | 102160434 | 8/2011 |
| EP | 2341741 | 7/2011 |
| JP | 2008079079 A | 4/2008 |
| JP | 2009235910 A | 10/2009 |
| JP | 2010536294 A | 11/2010 |
| JP | 2008079313 A | 4/2018 |
| KR | 20090029628 | 3/2009 |
| KR | 20090076769 | 7/2009 |
| KR | 20100036335 | 4/2010 |
| WO | 2008157800 | 6/2008 |
| WO | 200938368 | 9/2008 |
| WO | 2009096883 | 8/2009 |
| WO | 2010032775 | 3/2010 |
| WO | 2011061396 | 5/2011 |

OTHER PUBLICATIONS

Koren Office Action; Application 10-2014-7025310; 10 pages including translation; dated Apr. 11, 2018.

Chinese Office Action; Application No. 20150009802; 2 pages; dated Jun. 28, 2018.

Japanese Decision to Grant re Appln. No. 2017-031746; 3 pages; dated Aug. 28, 2018.

Patent Search Report; The State Intellectual Property Office of the People's Republic of China; Application No. 201280071353X; 4 pages including translation; dated Mar. 15, 2012.

Chinese Office Action; Application 201280071353.X; no translation; dated Aug. 1, 2017.

Chinese Office Action; Application 20150009802; 2 pages; dated Jun. 28, 2018.

Australian Office Action; Patent Application No. 2012373331; 017997.0368; dated Apr. 19, 2016.

3GPP TSG-RAN WG2#77, Dresden, Germany; TDOC R2-120822; MediaTek; 5 pages; Feb. 6-10, 2012.

3GPP TSG-RAN WG2#77, Dresden, Germany; TDOC R2-120464; Ericsson; 6 pages; Feb. 6-10, 2012.

Japanese Office Action; Notice of Reasons for Rejection; JP Patent Application No. 2015-500390; 5 pages including translation; dated Feb. 2, 2016.

3GPP TR 36.839 V0.5.0; 3rd Generation Partnership Project; Technical Specification Group Radio Access Network; Evolved Universal Terrestrial Radio Access (E-UTRA); Mobility Enhancement in Heterogeneous Networks (Release 11); Feb. 2012.

3GPP TSG-RAN WG2#78, Prague, Czech Republic; Title: RRC re-establishment in Hetnet HO failure (Tdoc R2-122533); May 21-25, 2012.

PCT Written Opinion of the International Searching Authority; International application No. PCT/SE2012/050288; dated Dec. 10, 2012.

* cited by examiner

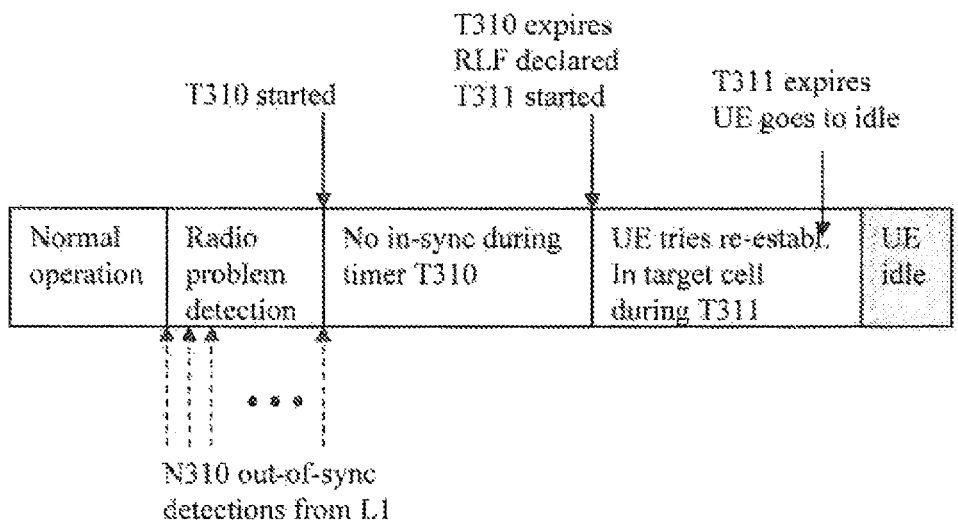

Fig. 2

| Timer | Start | Stop | At expiry |
|---|---|---|---|
| T310 | Upon detecting physical layer problems i.e. upon receiving N310 consecutive out-of-sync indications from lower layers | Upon receiving N311 consecutive in-sync indications from lower layers, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable E-UTRA cell or a cell using another RAT. | Enter RRC_IDLE |

| Constant | Usage |
|---|---|
| N310 | Maximum number of consecutive "out-of-sync" indications received from lower layers |
| N311 | Maximum number of consecutive "in-sync" indications received from lower layers |

Fig. 3

METHOD AND ARRANGEMENT FOR CONNECTION RE-ESTABLISHMENT IN A TELECOMMUNICATION SYSTEM

PRIORITY

This application is a division, under 35 U.S.C. § 120, of U.S. patent application Ser. No. 16/414,318 filed May 16, 2019, which is a continuation of U.S. patent application Ser. No. 14/381,492 filed Aug. 27, 2014, which is a U.S. National Stage Filing under 35 U.S.C. § 371 of International Patent Application Serial No. PCT/SE2012/050288, filed Mar. 15, 2012, and entitled "Method and Arrangement for Connection Re-Establishment in a Telecommunication System" all of which are hereby incorporated by reference in their entirety.

FIELD OF THE INVENTION

The present invention relates to controlling initiation of connection re-establishment upon detection of connectivity problems.

Communication devices such as User Equipments (UE) are also known as e.g. mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server. The concept of user equipment also comprises devices with communication capability of machine-type character such as sensors, measurement devices etc that not necessarily is in any interaction with a user.

The cellular communications network covers a geographical area which is divided into cell areas, wherein each cell area being served by a base station, e.g. a Radio Base Station (RBS), which sometimes may be referred to as e.g. "base station", "eNodeB", "NodeB", "B node", or BTS (Base Transceiver Station), depending on the technology and terminology used. The base stations may be of different to classes such as e.g. macro eNodeB, home eNodeB or pico base station, based on transmission power and thereby also cell size. A cell is the geographical area where radio coverage is provided by the base station at a base station site.

LTE Mobility

Mobility management is a challenging task in cellular communications systems and a well functioning mobility performance is crucial to the quality experienced by the end user. The Radio Resource Control protocol, RRC, see 3GPP TS 36.331, is the main signaling protocol for configuring, re-configuring and general connection handling in the LTE radio access network (E-UTRAN). RRC controls many functions such as connection setup, mobility, measurements, radio link failure and connection recovery.

A user equipment, UE, in LTE can be in two RRC states: RRC_CONNECTED and RRC_IDLE. In RRC_CONNECTED state, mobility is network-controlled based on e.g. measurements provided by the user equipment. That is, the network decides when and to which cell a user equipment should be handed over, based on e.g. measurement reports provided by the user equipment. The network, i.e. the LTE radio base station, called eNB in E-UTRAN configures various measurement events, thresholds etc based on which the user equipment then sends reports to the network, such that the network can make a decision to hand over the user equipment to a stronger cell as the user equipment moves away from the present cell.

FIG. 1 illustrates a simplified signaling scheme for the LTE handover, HO, procedure. It should be noted that the HO command is in fact prepared in the Target eNB, i.e. the eNodeB that the user equipment will be handed over to, but the message is transmitted via the Source eNB. That is, from the user equipment's perspective the message comes from the Source eNB.

In RRC_IDLE, mobility is handled by UE-based cell-selection, where a nomadic user equipment selects the "best" cell to camp on, based e.g. on various specified criteria and parameters that are broadcasted in the cells. For example, various cells or frequency layers could be prioritized over other, such that the user equipment tries to camp on a particular cell as long as the measured quality of a beacon or pilot in that cell is a threshold better than some other beacon or pilot received from other cells.

The present disclosure is primarily focusing on problems associated with network-controlled mobility as described above, i.e. for an LTE user equipment in RRC_CONNECTED state. The problems associated with failing handovers are therefore described in further detail below.

In a regular situation, and when a RRC_CONNECTED user equipment is moving out from the coverage of a first cell, also called source cell, it should be handed over to a neighboring cell, also called target cell or second cell before loosing the connection to the first cell. That is, it is desirable that the connection is maintained with no or minimal disruption throughout the handover, such that the end-user is unaware of the ongoing handover. In order to succeed with this, it is necessary that the measurement report that indicates the need for mobility is transmitted by the user equipment and received by the Source eNB, and the Source eNB has sufficient time to prepare the handover to the target cell (by, among other things, requesting a handover from the Target eNB controlling the target cell), and the user equipment receives the handover command message from the network, as prepared by the Target eNB in control of the target cell and sent via the source cell to the user equipment, see FIG. 1.

In addition, and in order for the handover to be successful, the user equipment must finally succeed in establishing a connection to the target cell, which in LTE requires a successful random access request in the target cell, and a subsequent transmission of a HO complete message from the user equipment to the Target eNB. It should be noted that specifications may differ somewhat in the naming of messages.

Thus, it is clear that in order for the handover to succeed, it is necessary that the sequence of events leading to a successful handover is started sufficiently early, so that the radio link to the first cell over which this signaling takes place does not deteriorate too much before completion of the signaling. If such deterioration happens before the handover signaling is completed in the source cell (i.e. first cell), then the handover is likely to fail. Such handover failures are clearly not desirable. The current RRC specification therefore provides various triggers, timers, and thresholds in order to adequately configure measurements, such that the need for handovers can be detected reliably, and sufficiently early.

In FIG. 1, the exemplified measurement report is triggered by a measurement event called A3 event, which in short means that a neighbor cell is found to be an offset better than the current serving cell. This means that a measurement report is sent to the network when a criterion or criteria associated with the event is satisfied. There exists many different measurement event types, and it should be noted that there are multiple events that could be configured to trigger a report.

A network node in control of a cell, such as an eNodeB in LTE terminology maintains a neighbor cell relation list. Whenever a reference is made to a neighbor cell in this disclosure, it should be understood as a reference to a cell typically comprised in the neighbor cell relation list of a network node. A neighbor cell is thus a cell that is often a candidate for a handover. In some cases, the network node maintains a neighbor cell list related to each cell that it is controlling. From the perspective of the user equipment, a neighbor cell is a cell in the proximity or overlapping with the cell to which the user equipment is currently connected to.

Radio Link Failure and RRC Connection Re-Establishment

It may occur that a user equipment looses coverage to the cell that the user equipment is currently connected to. This could occur in a situation when a user equipment enters a fading dip, or that a handover was needed as described above, but the handover failed for one or another reason. This is particularly true if the "handover region" is very short, as will be further described below.

The quality of the radio link is typically monitored in the user equipment e.g. on the physical layer, as described in 3GPP TS 36.300, TS 36.331 and TS 36.133, and summarized below.

Upon detection that the physical layer experiences problems according to criteria defined in TS 36.133, the physical layer sends an indication to the RRC protocol of the detected problems called out-of-sync indication. After a configurable number, N310, of such consecutive indications, a timer, T310, is started. If the link quality is not improved (recovered) while T310 is running, i.e. there are no N311 consecutive "in-sync" indications from the physical layer, a radio link failure, RLF, is declared in the user equipment, see FIG. 2.

The currently relevant timers and counters described above are listed in FIG. 4 for reference. The user equipment may read the timer values and counter constants from system information broadcasted in the cell. Alternatively, it is possible to configure the user equipment with UE-specific values of the timers and counter constants using dedicated signaling, i.e. where specific values and constants are given to specific user equipments with messages directed only to one or more specific user equipment.

The function of the timers and counters used for monitoring radio link failure in LTE is presented in the tables in FIG. 3

If T310 expires, the user equipment initiates a connection re-establishment to recover the ongoing RRC connection. This procedure includes cell selection by the user equipment. That is, the RRC_CONNECTED user equipment shall try to autonomously find a better cell to connect to, since the connection to the previous cell failed according to the described measurements. It could occur that the user equipment returns to the first cell anyway, but the same procedure is also then executed. Once a suitable cell is selected as further described e.g. in 3GPP TS 36.304, the user equipment requests to re-establish the connection in the selected cell. It is important to note the difference in mobility behaviour as an RLF results in user equipment based cell selection, in contrast to the normally applied network-controlled mobility.

If the re-establishment is successful, which depends on, among other things, if the selected cell and the eNB controlling that cell was prepared to maintain the connection to the user equipment, which implies that is was prepared to accept the re-establishment request, then the connection between the user equipment and the eNB can resume. In LTE, a re-establishment procedure includes a random-access request in the selected cell, followed by higher layer signalling where the user equipment sends a message with content based on which the user equipment can be identified and authenticated. This is needed so that the network can trust that it knows exactly which user equipment is attempting to perform the re-establishment.

A failure of a re-establishment means that the user equipment goes to RRC_IDLE and the connection is released. To continue communication, a new RRC connection has then to be requested and established. A failure could occur e.g. if the eNB that receives the re-establishment request is not able to identify the user equipment that requests the re-establishment. Such a condition may occur if the receiving eNB has not been informed or prepared for a possible re-establishment from this user equipment.

The reason for introducing the timers T31x and counters N31x described above is to add some freedom and hysteresis for configuring the criteria for when a radio link should be considered as failed and need to be re-established. This is desirable, since it would affect the end-user performance negatively if a connection is abandoned prematurely if it turned out that the loss of link quality was temporary and the user equipment succeeded in recovering the connection without any further actions or procedures, e.g. before T310 expires, or before the counter reaches value N310.

The re-establishment procedure will be described in the following: The network node, such as eNB, controlling a target cell receives a recovery request message from the user equipment, such as an RRC connection re-establishment request. In response to this message, the target eNB may respond with an RRC connection re-establishment message sent to the user equipment, by which the target eNB accepts the re-establishment request. The message may include various configuration parameters, such that the connection can be adapted and continued in the new cell. Other message names may of course apply, such as any reference to cell re-selection or handover.

Upon reception of re-establishment message, the user equipment may now process the content of that message, and resume the RRC connection according to the content and commands provided therein. Typically, the user equipment would further send a confirm message to the eNB of the target cell, where the confirm-message indicates that the communication between the user equipment and the target eNB can now resume. For example, the RRC connection re-establishment request, the re-establishment message, and subsequent confirm-message would typically include fields for supporting secure identification of the user equipment and fields for supporting contention resolution, i.e. such that the user equipment and its connection can be unambiguously and securely identified.

The recent and rapid uptake of Mobile Broadband has lead to a need for increasing the capacity of cellular networks. One solution to achieve such a capacity increase is to use denser networks consisting of several layers of cells with different sizes: Macro cells ensure large coverage with cells encompassing large areas, while micro-, pico- and even femto-cells are deployed in hot-spot areas where there is a large demand for capacity. Those cells typically provide connectivity in a much smaller area, but by adding additional cells and radio base-stations controlling those cells, capacity is increased as the new cells off-load the macros. Such networks are referred to as Heterogeneous Networks or HetNets. FIG. 9 shows a User equipment moving from the coverage of a pico-cell A into the coverage of macro cell B.

The different "layers" of cells can be deployed on the same carrier, i.e. in a reuse-1 fashion, the small cells could be deployed on a different carrier, and the different cells on the various layers could even be deployed using different technologies, e.g. 3H/HSPA on the macro- and micro-layer, and LTE on the pico-layer as one non-exclusive example.

There is currently a large interest for investigating the potential of such HetNets. However, it has also been found that HetNets may result in an increased rate of handover failures, as briefly discussed above. One reason is that the handover region in HetNets may be very short, meaning that the handover might fail since the user equipment lost coverage to the source cell before the handover to a target cell could be completed. For example, when a user equipment leaves a pico-cell, it may happen that the coverage border of the pico is so sharp, that the user equipment fails to receive any handover command towards a macro before loosing coverage to the pico, see FIG. 4.

Similar problems could occur when a user equipment connected to a macro cell suddenly enters a pico cell on the same carrier. It could now happen that the control channels of the pico interferes with the signals that the user equipment needs to receive from the macro in order to complete the handover, and the handover thus fails.

In failed handovers of the kind exemplified above, the user equipment will eventually try to re-establish the RRC connection. But this can only occur after the procedures prior to the recovery procedure have been completed, as described above: Thus, the user equipment will observe "out-of-sync" on Layer 1, L1, towards the source cell, those events will be counted on Layer 3, L3, level, i.e RRC, as described above until N310 such consecutive events have occurred, and then T310 will be started. Only when T310 has expired, the user equipment can initiate re-establishment procedure by searching for a better cell to connect to, in order to recover the RRC connection.

It is clear that this counting (up to N310) and the waiting of T310 to expire will result in an undesired interruption of the connectivity that is likely to be observable for the end-user.

One could therefore argue that the network should configure the relevant counters and timers (with N310 and T310 as non-exclusive examples) with small values in order to speed up the recovery. However, this could result in premature loss of the connection in case the radio problems were not due to an imminent handover, but only due to a sudden fading dip.

SUMMARY

As a consequence of the problem described in the foregoing, there is a difficulty in finding suitable criteria to trigger connection re-establishment, such as values of relevant counters and timers, that would be suitable for both the handover problems described here, and the more general case of a fading channel that experiences time-varying fluctuations in path-loss and interference.

It is therefore an objective of embodiments of the present invention to provide a solution for reducing the number of handover failures leading to connection release perceived by the end user.

More specifically, a first aspect of an embodiment of the invention relates to a method in a user equipment, UE, for controlling connection re-establishment between said user equipment and a network, said user equipment being served in a first cell comprised in said network. The method comprises the steps of receiving a configuration message from the network defining at least one condition;

upon detection of connectivity problems towards the first cell, evaluating said at least one condition;

if said at least one condition is fulfilled for a neighboring cell, applying at least one special criterion for initiating connection re-establishment to said neighboring cell, said at least one special criterion being different from at least one criterion that is applied if said at least one condition is not fulfilled.

A second aspect of an embodiment of the invention relates to a method in a network node to be comprised in a network for controlling connection re-establishment between the network and a user equipment, said network serving the user equipment in a first cell comprised in the network. The method comprises the steps of sending a configuration message to one or more user equipment defining at least one condition;

configuring said one or more user equipment to evaluate said at least one condition upon detection of connectivity problems towards the first cell;

configuring said one or more user equipment to apply at least one special criterion for initiating connection re-establishment to a neighboring cell if said at least one condition is fulfilled for said neighboring cell, said special criterion being different from at least one criterion that is applied if said at least one condition is not fulfilled.

A third aspect of an embodiment of the invention relates to a user equipment adapted for controlling connection re-establishment between said user equipment and a network, said user equipment being served in a first cell comprised in said network. The user equipment comprises a receiver configured to receive a configuration message from the network defining at least one condition;

a processor comprising circuitry configured to evaluate if said at least one condition is fulfilled upon detection of connectivity problems towards the first cell, and circuitry configured to apply said at least one special criterion for initiating connection re-establishment to a neighboring cell if said at least one condition is fulfilled for said neighboring cell, said at least one special criterion being different from at least one criterion that is applied if said at least one condition is not fulfilled.

A fourth aspect of an embodiment of the invention relates to an arrangement in a network node, to be comprised in a network, adapted for controlling connection re-establishment between the network and a user equipment, said network serving the user equipment in a first cell comprised in the network. The arrangement comprises a transmitter configured to send a configuration message to one or more user equipment defining at least one condition;

processing circuitry arranged to configure said one or more user equipment to evaluate said at least one condition upon detection of connectivity problems towards the first cell, and to apply at least one special criterion for initiating connection re-establishment to said neighboring cell if said at least one condition is fulfilled for a neighboring cell, said at lest one special criterion being different from at least one criterion that is applied if said at least one condition is not fulfilled.

Thus, embodiments are directed to reducing the interruption time in challenging radio environments, where handover failures are likely to happen. A fast re-establishment of the connection will reduce any interruption time experienced by an end user. Particular embodiments will also ensure that there is a higher likelihood of a successful connection recovery.

Other objects, advantages and novel features of the invention will become apparent from the following detailed description of the invention when considered in conjunction with the accompanying drawings and claims.

BRIEF DESCRIPTION OF THE DRAWINGS

The foregoing and other objects, features and advantages of the invention will be apparent from the following detailed description of preferred embodiments as illustrated in the drawings.

FIG. 2 shows how Radio Link Failure, RLF is declared in LTE;

FIG. 3 shows how RLF is monitored in LTE:

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The present invention is described within the context of E-UTRAN, also referred to as LTE. It should be understood that the problems and solutions described herein are equally applicable to wireless access networks and user equipments, user equipment's implementing other access technologies and standards. LTE is used as an example technology where the invention is suitable, and using LTE in the description therefore is particularly useful for understanding the problem and solutions solving the problem.

Various alternative embodiments for implementing the invention will be described in the following using non-exclusive examples.

Consider a user equipment in connected mode implementing network controlled mobility and connected to a first cell, e.g. a pico-cell. With the notation "connected to a cell", it should be noted that this implies that the user equipment is configured to send and/or receive data in at least this cell. Sometimes, this cell is also called "serving cell", or "primary cell", PCell. The cell is typically controlled by one network node such as a radio base station, which means that "connected to a cell" is in this respect equivalent to the user equipment being "connected to a first radio base station", that is, the radio base station that is in control of the aforementioned cell. Sometimes, this radio base station is called Serving eNB or serving radio base station.

Figure 1:
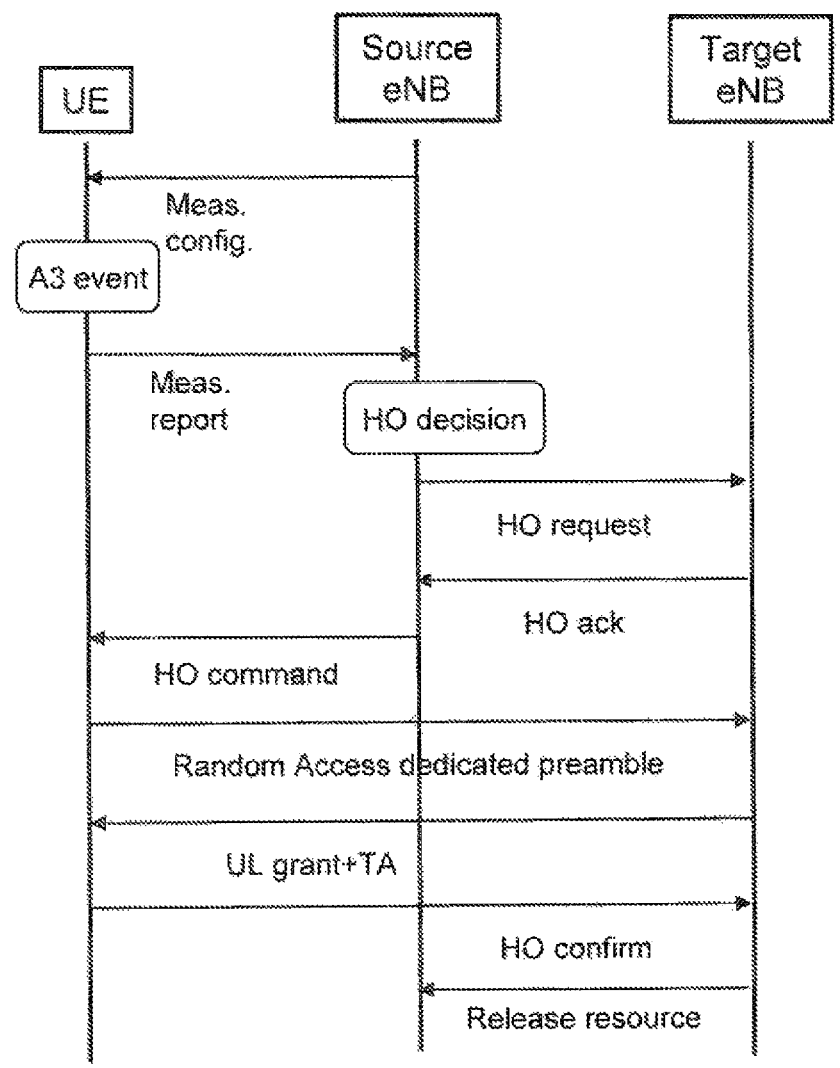
FIG. 1 shows a simplified signaling diagram illustrating the LTE handover procedure.
Figure 4:
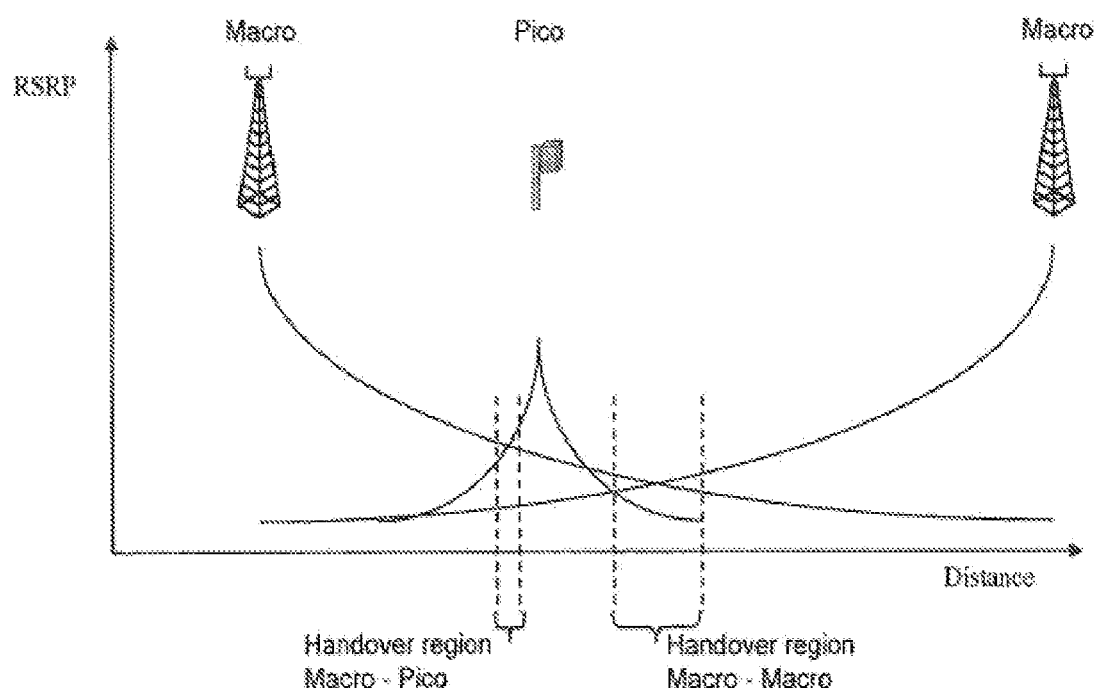
FIG. 4 illustrates the concept of handover regions of pico/macro vs macro/macro cell change.
Figure 9:
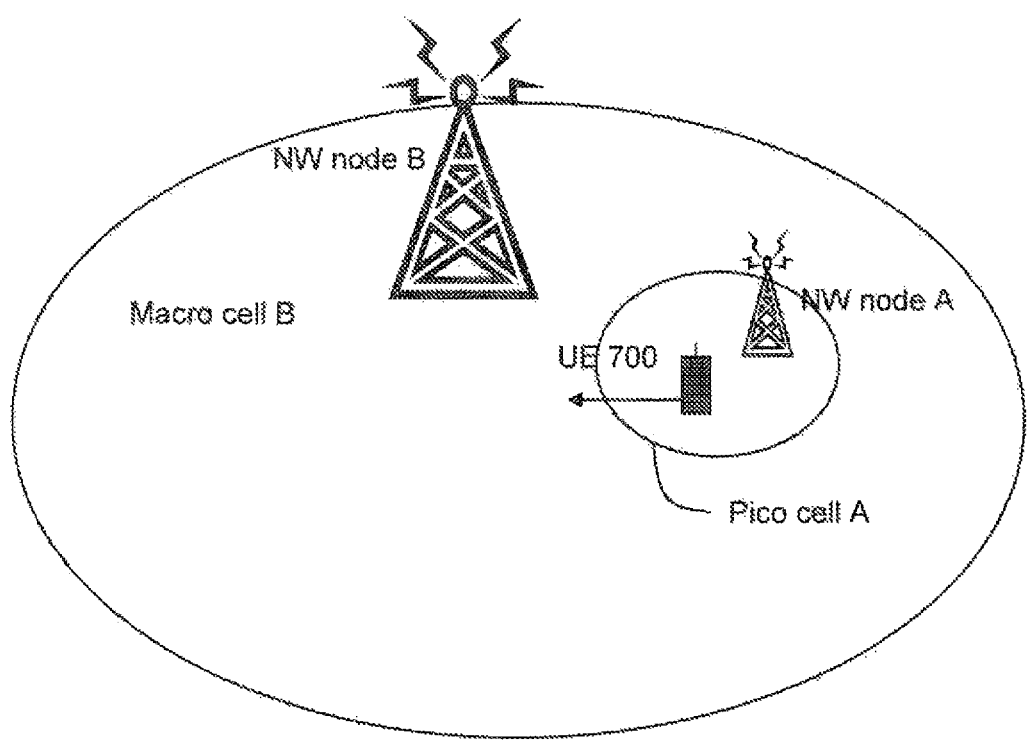
FIG. 9 shows a user equipment moving from the coverage of a pico-cell into the coverage of a macro cell.

In the example, the pico-cell is "surrounded" by a macro-cell that provides coverage in a much larger area, see FIG. 9. When the user equipment is moving out from the coverage of the small pico cell it is quickly loosing coverage of the pico cell that it is currently connected to, see FIG. 4. In such situation, there would be a rather high likelihood that the user equipment will loose connectivity to the pico-cell before a handover is completed, which means that the user equipment will experience a radio-link failure resulting in an undesired interruption in connectivity, as previously described.

The same problem could also occur if a user equipment moves from a macro cell to another cell, e.g. a pico-cell, where there is a very short handover region. The problem would be further exaggerated if the user equipment moves with a high speed.

Embodiments of the invention provide a possibility to bypass the ordinary, or "normal", evaluation of radio link failure for performing connection re-establishment in a particular neighboring cell provided at least one certain condition is fulfilled for said cell.

Figure 5:
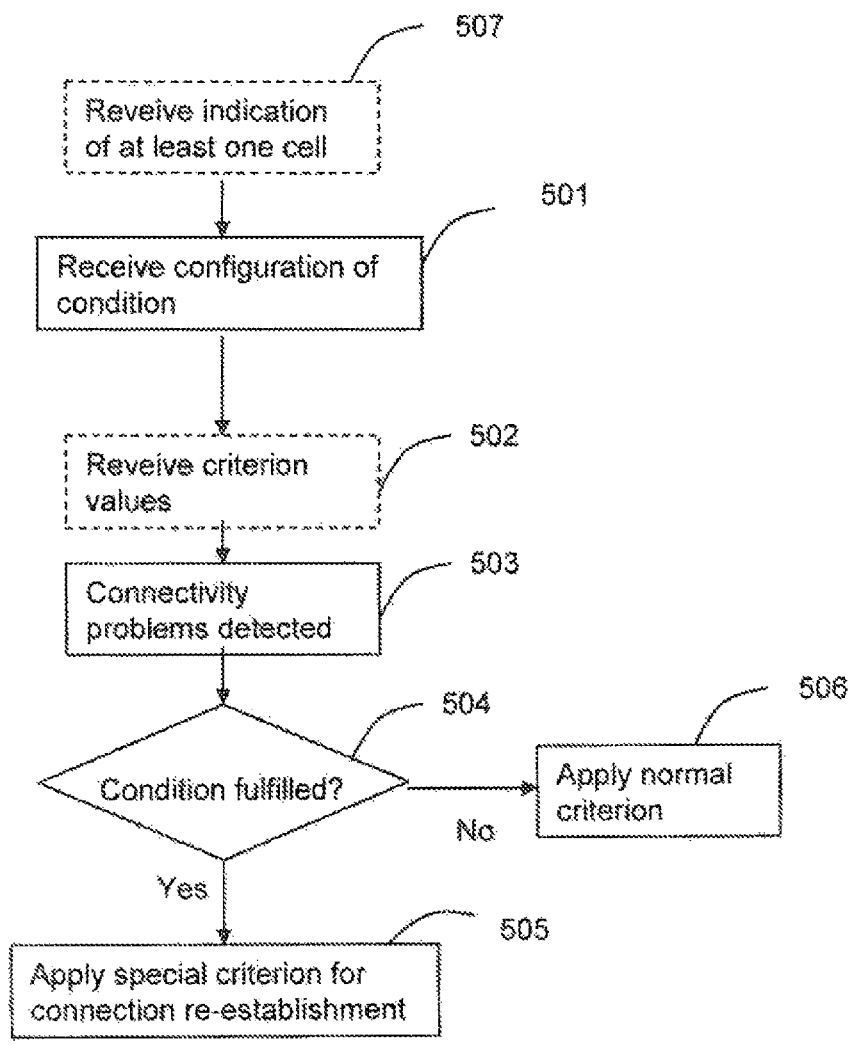
FIG. 5 shows a flowchart of a method embodiments according to embodiments performed in a user equipment.

FIG. 5 schematically illustrates method steps performed by a user equipment, UE, according to embodiments of the invention, said user equipment being served in a first cell, which in this example is the pico cell. In step 501, the user equipment receives a configuration message from the network defining at least one condition to be evaluated by the user equipment upon detection of connectivity problems towards the first cell. Said configuration message may be received on a broadcast channel or via dedicated signaling.

Said condition may be related to determining if the user equipment is within the coverage of any neighboring cell. The evaluation of whether the user equipment is within the coverage of a neighboring cell may be based on whether a received signal from a neighboring cell is stronger than a particular value e.g. a threshold value. Various quality parameters for defining the "strength" of such a received signal can be implemented, for example received signal power measurements and pathloss-related and interference related measurement criteria. This includes for example Reference symbol received power (RSRP) and Reference symbol received quality (RSRQ).

The network may configure the user equipment with a threshold or thresholds that defines whether the user equipment should consider itself within the coverage region of an indicated cell. The network may also configure the user equipment with a quality parameter to be used by the user equipment when evaluating whether the user equipment is within the coverage region of an indicated cell. If for example the RSRQ of an indicated cell in the example outlined above is greater than x dB, where x represents a configured threshold value, then the user equipment consider itself within the coverage region of that cell.

If the user equipment identifies that said at least one condition is fulfilled for multiple neighboring cells, e.g. that it is within coverage of multiple cells, there may be additional criteria for prioritizing the selection among those. For example, the user equipment may select the best one, where "best" is defined in terms of the measured criterion above, e.g. such that the cell with the strongest signal or best signal quality is selected. Alternatively, there could be additional priority criteria defined, such as a relative priority among cells comprised in a neighboring cell list, or offsets defining e.g. that cell A, or cells on frequency layer F_A should be selected if the cell or cells are x dB better in terms of the measured criterion when compared to another cell B or cells on another frequency layer F_B.

As the user equipment moves out from the coverage region of the first cell, which is the pico-cell in this example, it will detect physical layer problems or other problems related to the connectivity towards the first cell, i.e. the pico-cell, see step 503. The detection of physical layer problems may comprise receiving an out-of-sync indication from the physical layer or reading Reference Signal Received Power, RSRP, or Reference Signal Received Quality, RSRQ, below a certain absolute level towards the first cell. The network may configure the user equipment with a threshold or thresholds for RSRP or RSRQ that defines whether the user equipment should consider the connection to the source cell to be problematic. According to another alternative, detection of connectivity problems towards the first cell comprises the step of starting a timer when a measurement event related to a handover is triggered, and if no handover has been executed before the timer expires, connectivity problems are detected.

In step 504, the user equipment evaluates whether said at least one condition is fulfilled. Said condition may as already mentioned be related to determining whether the user equipment is within the coverage of a neighboring cell. The evaluation is done by checking if certain one or more conditions related to a neighboring cell are fulfilled as will be further described below. In such case, the user equipment will implement a fast connection re-establishment to such cell by applying the special criteria or criterion for initiating connection re-establishment in said cell, see step 505.

In a particular embodiment a condition is fulfilled when a received signal from said neighboring cell is stronger than a threshold value.

According to an alternative embodiment, a condition is fulfilled if a measurement event, e.g. A3, is triggered for said neighboring cell. Alternatively, a condition is fulfilled for a neighboring cell if a measurement report is transmitted to the network indicating that a measurement event is triggered for a neighboring cell. According to yet another alternative, a condition is fulfilled for a neighboring cell if an acknowledgement of a successfully transmitted measurement report indicating that a measurement event is triggered for a neighboring cell is received from the network.

A benefit of embodiments where the condition is tied to a measurement event that is already defined for the user equipment is that no new measurement of a target cell needs to be defined.

A benefit of the two latter embodiments, i.e. where a condition is fulfilled when a report is transmitted and an acknowledgement of the same is received respectively, is that they allow the network to be aware of the user equipments intentions to move to the neighboring cell which in this case is the target cell, and can initiate needed preparations, such as target cell preparation. It should be noted that the A3 event is merely an example and that other measurement events may be applied in the context of different embodiments.

If said at least one condition is fulfilled for a neighboring cell, then at least one special criterion for initiating connection re-establishment to said neighboring cell is applied, according to step 505. Said special criterion is different from at least one criterion for initiating connection re-establishment that would be applied if said at least one condition had not been fulfilled.

If said at least one condition is not fulfilled for a neighboring cell, the user equipment shall apply the normal criterion or criteria for initiating connection re-establishment, see step 506, and possibly do a normal re-establishment procedure based on e.g. regular cell selection procedures.

In an optional step 507, the user equipment receives, from the network, an indication of at least one cell for which said at least one special criterion should apply, provided that the at least one condition is fulfilled. Said indication may in some embodiments be comprised in the configuration message received in step 501.

The indication of at least one cell provided to the user equipment in step 501 or 507 may be in different forms. According to a specific embodiment, said indication comprises an indication of all neighboring cells of the first cell. In this case, there is no need to specifically indicating, or pinpointing, particular cells, but there is merely an indication sent from the network to one or more user equipment stating that the user equipment shall apply the special criterion or criteria allowing the fast re-establishment solution whenever said at least one specific condition for fast re-establishment procedure is fulfilled.

According to another specific embodiment, said indication comprises an indication of a particular frequency layer such that all neighboring cells on said frequency layer are indicated. This means that in case the at least one condition is fulfilled, the user equipment should apply the fast connection re-establishment solution towards cells on a particular frequency layer provided that said at least one condition is fulfilled, but not on another frequency layer. Also in such cases, there may be no need to indicate particular cells on the layer, since all neighbor cells on the particular frequency layer are indicated with a single indication.

According to yet another specific embodiment, said indication comprises a list of indicated cells, towards which the user equipment shall perform a fast re-establishment of the connection in case the at least one condition is fulfilled. In case the indication is provided in the form of a list of cells, the cells in the list would be identified by a cell identification, typically by their physical cell identity, PCI, but other indexes or identification methods for identifying the cells in the list may also apply. Such list may also comprise an indication of which frequency layer a cell indicated by said identification is to be found on.

The indication provided in step 507 may be provided to the user equipment on a broadcast channel, BCCH in LTE terminology, or it may be provided by dedicated signaling, where a message is sent to a particular user equipment or group of user equipments, but not to all user equipments in that cell. Broadcast signaling typically implies that the message or messages are sent to some or all user equipments within the coverage of a cell. The messages are then often repeated periodically, so that user equipments entering the cell can receive the message or messages at the next opportunity. Dedicated signaling from the network typically implies that the message is directed to one particular receiver or group of receivers, by specifically addressing this user equipment or group of user equipments in the transmission of the message. Thus, the message may be sent only once followed by an acknowledgement from the receiving user equipment.

The application of criterion or criteria to be fulfilled for initiating connection re-establishment may in some embodiments include the use of counters and or timers to evaluate when the user equipment shall initiate connection re-establishment in an indicated cell. The counters and/or timers may be the same as those used in "normal" recovery procedures. For example, the network configures the user equipment with a counter value N310 equal to 10 and a timer expiration value T310 equal to 500 milliseconds. A "normal" connection re-establishment is then initiated after 10 consecutive "out-of-synch" indications followed by the starting and expiry of a timer T310, i.e. followed by a 0.5 second waiting time. Only then, the user equipment selects a cell towards which the user equipment performs a re-establishment request.

According to a particular embodiment, re-establishment is initiated to a neighboring cell immediately when said at least one condition is fulfilled for that cell. This means that the re-establishment is initiated as soon as said at least one condition is fulfilled, i.e. no additional criteria for initiating connection re-establishment is applied. Such embodiment will be explained using the following non-limiting example:

A user equipment is configured by the network to initiate connection re-establishment towards a certain neighboring cell upon detection of connectivity problem towards its serving cell in case an A3 event has been triggered for said neighboring cell. Let us assume that the connectivity problem is detected by reception of an out-of-synch indication from the physical layer. According to this particular embodiment, the user equipment will then stop the counter N310 counting out-of synch indications from the physical layer or timer T310 controlling radio link failure and immediately initiate connection re-establishment towards the neighboring cell for which the A3 event has been triggered, i.e. towards the target cell.

In an alternative example embodiment, said at least one special criterion include expiration of a timer at a certain expiration value, said expiration value being different from an expiration value of said timer that is applied for "normal" connection re-establishment, i.e. if said at least one condition had not been fulfilled, and/or reaching a threshold value of a counter, said threshold being different from a threshold value for said counter that is applied if said at least one condition had not been fulfilled, i.e. for normal connection re-establishment. Thus, the user equipment may implement and use different values of timers and/or counters to evaluate when the user equipment shall initiate a connection re-establishment when said at least one condition has been fulfilled.

Thus, according to embodiments of the present invention, the user equipment may perform an RRC connection re-establishment to a neighboring cell prior to finalizing the counting and expiry of the timer, e.g. T310, according to a "normal" connection re-establishment procedure, provided that the at least one condition is fulfilled.

For example, the counter threshold value may as a special criterion be set to 3, such that the special criterion implies that the user equipment may initiate a re-establishment towards a neighboring cell for which said at least one condition is fulfilled after 3 "out-of-synch" indications. Alternatively, or in addition, the timer expiration value may as another special criterion be set to 100 milliseconds, such that the user equipment may initiate the re-establishment towards a neighboring cell for which said at least one condition is fulfilled after 100 milliseconds from starting T310.

In another alternative embodiment, said at least one special criterion involves the use of at least one different counter and/or timer in addition to at least one counter and/or timer used for "normal" initiation of connection re-establishment, said different counter and/or timer govern when the user equipment is allowed to initiate re-establishment of the connection to a cell for which the condition is fulfilled. For example, initiation of re-establishment in a cell for which the condition is fulfilled could be associated with a counter value "3" of a counter N410, and a timer-value "100 ms" of a timer "T410". The naming of the timers and counters should be seen as examples only and do not imply any limitations to the applicability of embodiments of the invention. The same counter "N410" and timer "T410" could be used for governing the recovery to all neighboring cells. There could also be separate values for the counter and timer of each neighboring cell or group of neighboring cells.

Numerous variations and combinations are possible. Values of counters and timers for evaluating when the user equipment should attempt to re-establish the connection to a neighboring cell, both for the cases when the at least one condition is fulfilled or not fulfilled, could in some embodiments be configurable by the network, see optional steps 502 in FIGS. 5 and 603 in FIG. 6.

Embodiments of the present invention also includes the network aspects for configuring the user equipment with at least one condition to evaluate in order to determine if a user equipment shall implement a fast connection re-establishment procedure towards a particular neighboring cell. On the network side, the rationale of providing such at least one condition to be evaluated upon detection of connectivity problems towards the first, i.e. serving cell to a user equipment or group of user equipments is that handover is particularly challenging in some deployments. Thus, it often happens that one has to resort to connection recovery as initiated by the user equipment in particular regions. Therefore, there is an incentive to speed up this recovery at places where such problems are likely.

Figure 6:
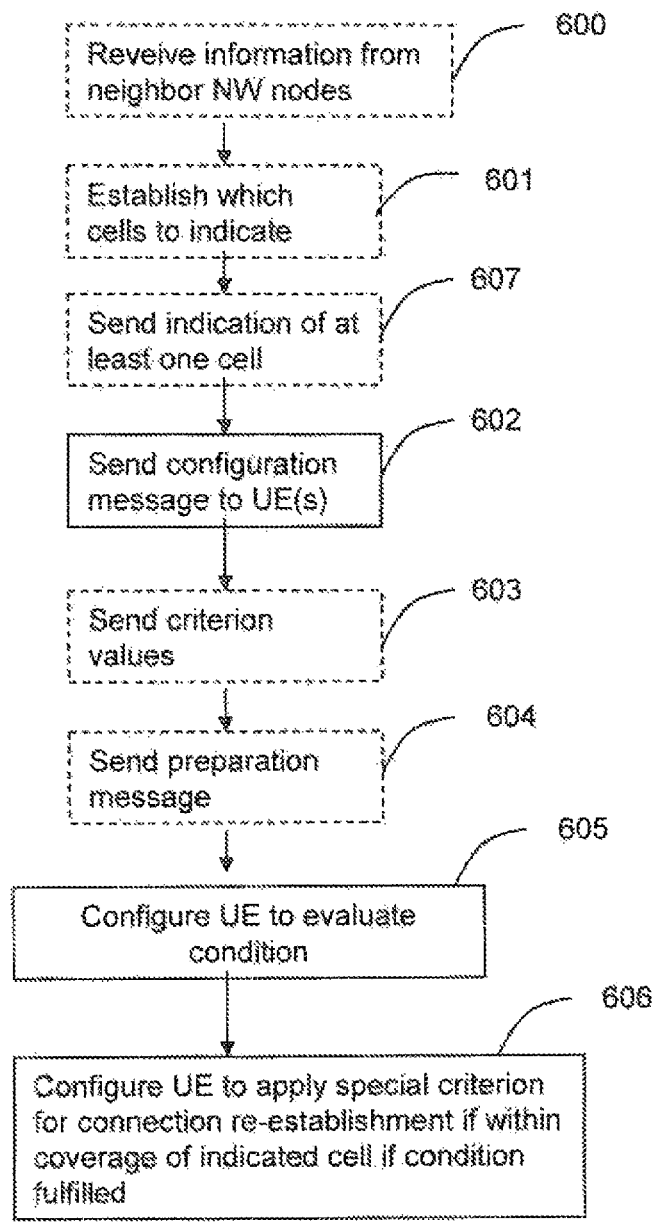
FIG. 6 shows a flowchart of a method embodiments performed in a network node.

FIG. 6 schematically illustrates method steps performed by a network node according to embodiments of the invention. In step 602, the network node sends a configuration message to one or more user equipments being served in a first cell that is controlled by said network node, the message defining at least one condition. Examples of such condition have been described in the foregoing in relation to the description of the method performed by the user equipment. In step 605, one or more user equipment is configured by the network node to evaluate said at least one condition upon detection of connectivity problems towards the first cell. In step 606, said one or more user equipment is configured by the network node to apply at least one special criterion for initiating connection re-establishment to a neighboring cell if said at least one condition is fulfilled for said neighboring cell, said special criterion being different from at least one criterion that would be applied if said at least one condition had not been fulfilled.

In an optional step 607, the network node sends an indication of at least one cell for which said at least one special criterion for initiating connection re-establishment apply if said at least one condition is fulfilled. The indication of at least one cell can be in different forms as described in the foregoing in relation to the description of the method performed by the user equipment.

In an optional step 600, the network node receives information from one or more neighboring network nodes about previous re-establishment requests in order to establish which cells that should be indicated to the one or more user equipment in step 607. Thus, the network uses statistics from e.g. previous handover failures in order to establish which neighbor cells that should be indicated. For example, if there is information in an eNB that handovers from its cell A to cell B often fails, the network may add cell B as an indicated cell towards which user equipments should implement fast connection re-establishment by application of said at least one special criterion. The information of e.g. failed handovers may for example be received from neighboring network nodes over an X2, S1 or O&M interface.

A network node may thus be arranged to collect information about connectivity problems such as handovers that have failed, in order to provide such information to other eNBs in control of neighboring cells. For example, a network node B in control of cell B finds that user equipments often arrives in this cell after a failed handover from cell A, see FIG. 9. The network node B in control of cell B may receive this information in a RLF-report message, see 3GPP TS 36.331 and the information element may be failedPCelIId. The network node B collects this information, and sends it directly, or via some aggregating node, e.g. an O&M node, to the network node A in control of cell A, whereby that network node can add cell B as an indicated cell towards which user equipments shall implement fast recovery.

In optional step 601, the network node establishes which cells that should be indicated to the user equipment that is sent in step 607. This can be done by utilizing information or statistics of previous connectivity problems, either received from neighboring network nodes as described in the foregoing or available in itself.

In step 604, which is an optional step relating to a particular embodiment, the network prepares neighboring cells that has been indicated to the one or more user equipments in step 607 by sending a message to at least one second network node that is in control of such indicated cell, e.g. a radio base station or eNodeB in LTE terminology, such that the second network node is prepared to receive connection re-establishment requests from particular user equipments currently connected to the first cell. The preparation may include sending a handover request from the first network node to the second network node. If both cells are controlled by the same network node, no message needs to be sent, but the network node may itself be prepared for a connection re-establishment from UE1 in an indicated cell.

Alternatively, if no preparation message is sent, a second network node in control of an indicated cell will not receive any information related to any user equipment that might request connection re-establishment in said indicated cell. Therefore, said second network node is not in possession of any user equipment context related to such user equipment. The second network node in control of an indicated cell may then fetch the context of such user equipment from the network node in control of the first cell. Such fetching implies that the second network node, upon detection of a re-establishment request from a user equipment, requests information related to the user equipment from the first network node. The fetching is successful if the second network node receives necessary information related to the user equipment to accept the re-establishment request. When the fetching is successful, the second network node may accept the re-establishment from the user equipment.

Figure 7:
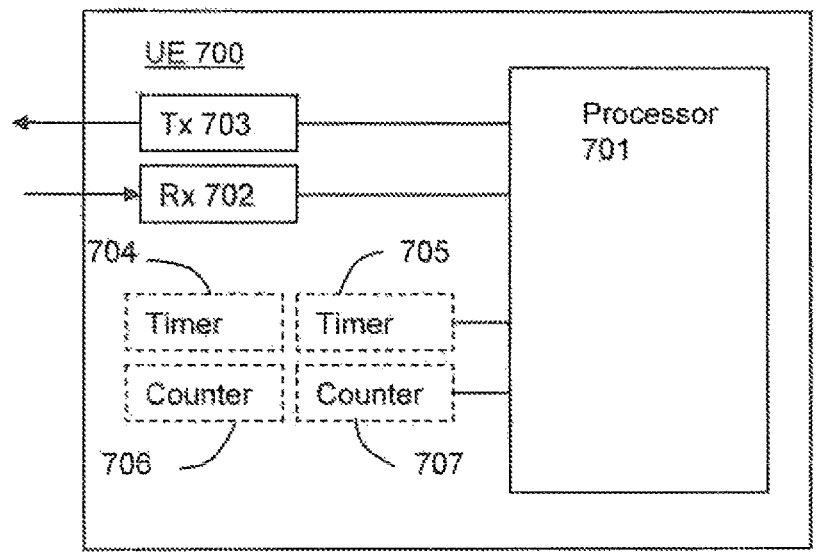
FIG. 7 shows schematically a user equipment according to embodiments.

A user equipment 700, UE, according to embodiments of the invention is schematically illustrated in FIG. 7. The user equipment comprises a receiver 702 and a transmitter 703. Said receiver is configured to receive a configuration message from the network defining at least one condition. Examples of such condition have been described in the foregoing in relation to the description of the method performed by the user equipment. Said message can be received either on a broadcast channel or via dedicated signaling.

The user equipment 700 furthermore comprises a processor 701 comprising processing circuitry configured to evaluate if said at least one condition is fulfilled upon detection of connectivity problems towards the first cell, and circuitry configured to apply said at least one special criteria for initiating connection re-establishment to said neighboring cell if said at least one condition is fulfilled for a neighboring cell, said at least one special criterion being different from at least one criterion that would be applied if said at least one condition had not been fulfilled.

In some embodiments, the user equipment 700 furthermore comprises a timer 704 and/or a counter 706. In one specific embodiment, said at least one special criterion include expiration of the timer 704 at a certain expiration value, said expiration value being different from an expiration value of said timer 704 that is applied if said at least one condition had not been fulfilled and/or reaching a threshold value of the counter 706, said threshold being different from a threshold value for the counter 706 that is applied if said at least one condition had not been fulfilled. In one particular embodiment, the timer 704 may be the timer T310, and the counter 706 may be the counter N310.

In yet further embodiments, the user equipment 700 comprises another, different counter 707 and/or timer 705 for initiating connection re-establishment to a neighboring cell in addition to a counter 706 and/or timer 704 used for initiating re-establishment to a cell if said at least one condition had not been fulfilled.

Figure 8:
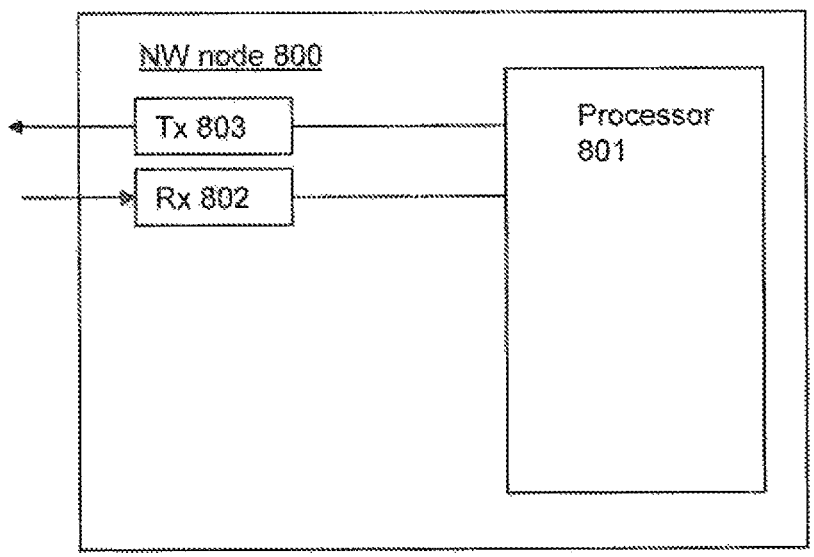
FIG. 8 shows schematically an arrangement in a network node according to embodiments.

An arrangement in a network node 800 is schematically illustrated in FIG. 8. The network node is adapted to be comprised in a network and is furthermore adapted for controlling connection re-establishment between the network and a user equipment, UE, said network serving the user equipment in a first cell comprised in the network.

The arrangement comprises a receiver 802 and a transmitter 803. The transmitter 803 is configured to send a configuration message to one or more user equipments defining at least one condition. Examples of such condition have been described in relation to the description of the method embodiments performed by the user equipment. Said message can be transmitted either on a broadcast channel or via dedicated signaling.

The arrangement in the network node 800 furthermore comprises a processor (801) comprising processing circuitry arranged to configure said one or more user equipment to evaluate said at least one condition upon detection of connectivity problems towards the first cell. The processing circuitry is furthermore arranged to configure the one or more user equipment to apply at least one special criterion for initiating connection re-establishment to said neighboring cell if said at least one condition is fulfilled for a neighboring cell, said special criterion being different from at least one criterion that would be applied if said at least one condition had not been fulfilled.

In some embodiments, the transmitter 803 is configured to send an indication of at least one cell for which said at least one special criterion for initiating connection re-establishment apply if said at least one condition is fulfilled. The indication of at least one cell can be in different forms as described in the foregoing in relation to the description of the method performed by the user equipment.

In some embodiments, the receiver 802 is configured to receive information from one or more neighboring network nodes about previous re-establishment requests in order to establish which at least one cell that should be indicated to the one or more user equipment.

In some embodiments, the processor (801) comprises circuitry configured to utilize information of previous connectivity problems to establish which cells that should be indicated to the one or more user equipment. Said processing circuitry may also be configured to use information or statistics received by receiver (802) from neighboring network nodes about re-establishment requests, to establish which cells that should be indicated to the one or more user equipment.

In some embodiments, the transmitter (803) may be configured to send a preparation message to at least one neighboring network node controlling at least one cell indicated to said one or more user equipments, for preparing such network node to receive a connection re-establishment request from said one or more user equipments.

The method steps performed by the user equipment (700) and the arrangement in the network node (800) are performed by functional elements of the processing circuitry in their respective processors 701 and 801. In some embodiments these functions are carried out by appropriately programmed microprocessors or microcortrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of baseband processing circuitry for mobile devices and wireless base stations are well known and are unnecessary to a full understanding of the invention, additional details are not shown here Program code stored in the memory circuit may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

The present invention may, of course, be carried out in other ways than those specifically set forth herein without departing from essential characteristics of the invention. The present embodiments are to be considered in all respects as illustrative and not restrictive.

The invention claimed is:

1. A method in a user equipment, UE, for controlling connection re-establishment between said user equipment and a network, said user equipment being served in a first cell comprised in said network, the method comprising:
   receiving a configuration message from the network, the configuration message defining one or more conditions to be fulfilled in order to apply a fast re-establishment procedure, wherein the one or more conditions comprise one or more of the following conditions:
   a condition that is defined to be fulfilled when, based on a received signal from a neighboring cell, the user equipment is within the coverage of said neighboring cell;
   a condition that is defined to be fulfilled when the received signal from said neighboring cell is stronger than a threshold value; and
   a condition that is defined to be fulfilled when, based on the received signal from said neighboring cell, a measurement event or measurement report is triggered for said neighboring cell;
   upon detection of connectivity problems towards the first cell, evaluating said one or more conditions; and
   applying the fast re-establishment procedure or a normal re-establishment procedure with respect to said neighboring cell depending on whether the one or more conditions are fulfilled for said neighboring cell, wherein the fast re-establishment procedure initiates connection re-establishment to said neighboring cell faster if said one or more conditions are fulfilled than the normal re-establishment procedure that said user equipment would otherwise apply if said one or more conditions were not fulfilled.

2. The method according to claim 1, the method further comprising:
   receiving, from the network, an indication of one or more cells for which said fast re-establishment procedure applies if said one or more conditions are fulfilled.

3. The method according to claim 1, wherein said fast re-establishment procedure initiates connection re-establishment to said neighboring cell at a certain expiration value of a timer, said expiration value being different from an expiration value of said timer that is applied for said normal re-establishment procedure.

4. A method in a network node to be comprised in a network for controlling connection re-establishment between the network and a user equipment, said network serving the user equipment in a first cell comprised in the network, the method comprising:
   sending a configuration message to the user equipment, the configuration message defining one or more conditions to be fulfilled in order for the user equipment to apply a fast re-establishment procedure, wherein the one or more conditions comprise one or more of the following conditions:
   a condition that is defined to be fulfilled when, based on a received signal from a neighboring cell, the user equipment is within the coverage of said neighboring cell;
   a condition that is defined to be fulfilled when the received signal from said neighboring cell is stronger than a threshold value; and a condition that is defined to be fulfilled when, based on the received signal from said neighboring cell, a measurement event or measurement report is triggered for said neighboring cell;

configuring the user equipment to evaluate said one or more conditions upon detection of connectivity problems towards the first cell; and configuring the user equipment to apply the fast re-establishment procedure or a normal re-establishment procedure with respect to said neighboring cell depending on if said one or more conditions are fulfilled for said neighboring cell, wherein the fast re-establishment procedure initiates connection re-establishment to said neighboring cell faster if said one or more conditions are fulfilled than the normal re-establishment procedure that the user equipment would otherwise apply if said one or more conditions were not fulfilled.

5. The method according to claim 4, the method further comprising:

sending the user equipment an indication of one or more cells for which said fast re-establishment procedure applies if said one or more conditions are fulfilled.

6. The method according to claim 5, wherein the network node utilizes information of previous connectivity problems to establish which cells should be indicated to the user equipment.

7. The method according to claim 5, wherein the network node receives information from neighboring network nodes about previous re-establishment requests in order to establish which cells should be indicated to the user equipment.

8. The method according to claim 5, wherein the network node sends a preparation message to at least one network node controlling at least one cell being indicated to the user equipment, the preparation message for preparing such network node to receive a connection re-establishment request from the user equipment.

9. A user equipment adapted for controlling connection re-establishment between said user equipment and a when said user equipment is being served in a first cell comprised in said network, said user equipment comprising:

a receiver, the receiver configured to:
receive a configuration message from the network, the configuration message defining one or more conditions to be fulfilled in order to apply a fast re-establishment procedure, wherein the one or more conditions comprise one or more of the following conditions:
a condition that is defined to be fulfilled when, based on a received signal from a neighboring cell, the user equipment is within the coverage of said neighboring cell;
a condition that is defined to be fulfilled when the received signal from said neighboring cell is stronger than a threshold value; and
a condition that is defined to be fulfilled when, based on the received signal from said neighboring cell, a measurement event or measurement report is triggered for said neighboring cell; and processing circuitry, the processing circuitry configured to:
upon detection of connectivity problems towards the first cell, evaluate said one or more conditions; and
apply the fast re-establishment procedure or a normal re-establishment procedure with respect to said neighboring cell depending on whether the one or more conditions are fulfilled for said neighboring cell, wherein the fast re-establishment procedure initiates connection re-establishment to said neighboring cell faster if said one or more conditions are fulfilled than the normal re-establishment procedure that said user equipment would otherwise apply if said one or more conditions were not fulfilled.

10. The user equipment according to claim 9, wherein said receiver is further configured to receive, from the network, an indication of one or more cells for which said fast re-establishment procedure applies if said one or more conditions are fulfilled.

11. The user equipment according to claim 9, wherein said fast re-establishment procedure initiates connection re-establishment to said neighboring cell at a certain expiration value of a timer, said expiration value being different from an expiration value of said timer that is applied for said normal re-establishment procedure.

12. An arrangement in a network node, the arrangement comprising:

a transmitter, the transmitter configured to:
send a configuration message to the user equipment, the configuration message defining one or more conditions to be fulfilled in order for the user equipment to apply a fast re-establishment procedure, wherein the one or more conditions comprise one or more of the following conditions:
a condition that is defined to be fulfilled when, based on a received signal from a neighboring cell, the user equipment is within the coverage of said neighboring cell;
a condition that is defined to be fulfilled when the received signal from said neighboring cell is stronger than a threshold value; and
a condition that is defined to be fulfilled when, based on the received signal from said neighboring cell, a measurement event or measurement report is triggered for said neighboring cell; and processing circuitry, the processing circuitry configured to:
configure the user equipment to evaluate said one or more conditions upon detection of connectivity problems towards a first cell, and
configure the user equipment to apply the fast re-establishment procedure or a normal re-establishment procedure with respect to said neighboring cell depending on if said one or more conditions are fulfilled for said neighboring cell, wherein the fast re-establishment procedure initiates connection re-establishment to said neighboring cell faster if said one or more conditions are fulfilled than the normal re-establishment procedure that the user equipment would otherwise apply if said one or more conditions were not fulfilled.

13. The arrangement according to claim 12, the transmitter further configured to transmit, to the user equipment, an indication of one or more cells for which said fast re-establishment procedure applies if said one or more conditions are fulfilled.

14. The arrangement according to claim 13, wherein the processing circuitry is further configured to utilize information of previous connectivity problems to establish which cells should be indicated to the user equipment.

15. The arrangement according to claim 13, wherein:
the arrangement further comprises a receiver configured to receive information from neighboring network nodes about re-establishment requests; and
the processing circuitry is further configured to use the information to establish which cells should be indicated to the user equipment.

16. The arrangement according to claim 13, wherein said transmitter is configured to send a preparation message to at least one network node controlling at least one cell being indicated to the user equipment, the preparation message for preparing such network node to receive a connection re-establishment request from the user equipment.

* * * * *

UNITED STATES PATENT AND TRADEMARK OFFICE
CERTIFICATE OF CORRECTION

PATENT NO. : 11,388,766 B2
APPLICATION NO. : 16/860186
DATED : July 12, 2022
INVENTOR(S) : Wager et al.

It is certified that error appears in the above-identified patent and that said Letters Patent is hereby corrected as shown below:

On the Title Page

In Column 1, below "Related U.S. Application Data", delete Item "(60)" and insert Item -- (62) --, therefor.

On Page 2, in Item (56), under "OTHER PUBLICATIONS", in Column 2, Line 1, delete "Koren" and insert -- Korean --, therefor.

On Page 2, in Item (56), under "OTHER PUBLICATIONS", in Column 2, Line 16, delete "WG2#77," and insert -- WG2 meeting #77, --, therefor.

On Page 2, in Item (56), under "OTHER PUBLICATIONS", in Column 2, Line 18, delete "WG2#77," and insert -- WG2 meeting #77, --, therefor.

On Page 2, in Item (56), under "OTHER PUBLICATIONS", in Column 2, Line 27, delete "WG2#78," and insert -- WG2 meeting #78, --, therefor.

In the Specification

In Column 1, Line 9, delete "2019," and insert -- 2019, now Pat. No. 10,674,559, --, therefor.

In Column 1, Line 10, delete "2014," and insert -- 2014, now Pat. No. 10,306,694, --, therefor.

In Column 1, Line 45, delete "etc" and insert -- etc., --, therefor.

In Column 1, Lines 53-54, delete "different to classes" and insert -- different classes --, therefor.

In Column 2, Line 9, delete "etc" and insert -- etc., --, therefor.

In Column 4, Line 16, delete "that is was" and insert -- that it was --, therefor.

Signed and Sealed this
Fourteenth Day of March, 2023

Katherine Kelly Vidal
*Director of the United States Patent and Trademark Office*

CERTIFICATE OF CORRECTION (continued)
U.S. Pat. No. 11,388,766 B2

In Column 4, Lines 35-36, delete "timers T31x and counters N31x" and insert -- timers T310 and counters N310 --, therefor.

In Column 5, Line 12, delete "base-stations" and insert -- base stations --, therefor.

In Column 5, Line 46, delete "i.e" and insert -- i.e. --, therefor.

In Column 7, Line 10, delete "at lest" and insert -- at least --, therefor.

In Column 7, Line 35, delete "LTE:" and insert -- LTE; --, therefor.

In Column 7, Line 53, delete "etc." and insert -- etc., --, therefor.

In Column 8, Line 8, delete "equipment's" and insert -- equipments --, therefor.

In Column 9, Lines 2-3, delete "Reference symbol received power (RSRP) and Reference symbol received quality (RSRQ)." and insert -- Reference signal received power (RSRP) and Reference signal received quality (RSRQ). --, therefor.

In Column 11, Line 23, delete "and or" and insert -- and/or --, therefor.

In Column 11, Line 31, delete ""out-of-synch"" and insert -- "out-of-sync" --, therefor.

In Column 11, Line 43, delete "example:" and insert -- example. --, therefor.

In Column 11, Line 49, delete "out-of-synch" and insert -- out-of-sync --, therefor.

In Column 12, Line 14, delete ""out-of-synch"" and insert -- "out-of-sync" --, therefor.

In Column 12, Line 44, delete "FIGS." and insert -- FIG. --, therefor.

In Column 13, Line 64, delete ""UE1"" and insert -- UE --, therefor.

In Column 15, Line 46, delete "microcortrollers," and insert -- microcontrollers, --, therefor.

In Column 15, Line 56, delete "here" and insert -- here. --, therefor.

In the Claims

In Column 17, Line 38, in Claim 9, delete "user equipment and a when" and insert -- user equipment and a network, when --, therefor.

In Column 18, Line 20, in Claim 12, delete "the user equipment," and insert -- a user equipment, --, therefor.